United States Patent
Wakao et al.

(10) Patent No.: US 7,159,541 B2
(45) Date of Patent: Jan. 9, 2007

(54) METHOD AND APPARATUS FOR DETERMINING STATE OF REFORMER

(75) Inventors: Kazuhiro Wakao, Susono (JP); Kazuhiro Sakurai, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/911,584

(22) Filed: Aug. 5, 2004

(65) Prior Publication Data

US 2005/0045118 A1 Mar. 3, 2005

(30) Foreign Application Priority Data

Aug. 27, 2003 (JP) ............... 2003-303204

(51) Int. Cl.
*F02M 27/02* (2006.01)
(52) U.S. Cl. .......................... 123/3; 422/105
(58) Field of Classification Search .................. 123/3; 422/105, 110
See application file for complete search history.

(56) References Cited

U.S. PATENT DOCUMENTS

| | | | | |
|---|---|---|---|---|
| 3,955,941 A | * | 5/1976 | Houseman et al. ............. 48/95 |
| 4,567,857 A | * | 2/1986 | Houseman et al. ............. 123/3 |
| 4,884,531 A | * | 12/1989 | Degnan et al. ................. 123/3 |
| 5,425,332 A | * | 6/1995 | Rabinovich et al. ........... 123/3 |
| 5,976,723 A | * | 11/1999 | Boffito et al. ................. 429/17 |
| 6,205,957 B1 | * | 3/2001 | Saylor ........................... 123/3 |
| 6,322,757 B1 | * | 11/2001 | Cohn et al. ............. 422/186.04 |
| 6,397,790 B1 | * | 6/2002 | Collier, Jr. ....................... 123/3 |
| 6,463,889 B1 | * | 10/2002 | Reddy ............................ 123/3 |
| 6,508,209 B1 | * | 1/2003 | Collier, Jr. ....................... 123/3 |
| 6,823,662 B1 | * | 11/2004 | Yamamoto et al. ........... 60/286 |

FOREIGN PATENT DOCUMENTS

JP    A 2002-54427    2/2002

OTHER PUBLICATIONS

U.S. Appl. No. 10/816,857, filed Apr. 5, 2004, Wakao et al.

* cited by examiner

*Primary Examiner*—Noah P. Kamen
*Assistant Examiner*—Jason Benton
(74) *Attorney, Agent, or Firm*—Oliff & Berridge, PLC

(57) ABSTRACT

An internal combustion engine includes a reformer for reforming a fuel air mixture to produce a reformed gas, a crank angle sensor for detecting a rotational speed of the engine, and an ECU. The ECU obtains a difference of an actual rotational speed from a target rotational speed of the engine during an idling thereof based on a signal from the crank angle sensor. When the difference thus obtained exceeds a predetermined threshold value, the ECU determines that a reforming catalyst of the reformer has deteriorated or there is any abnormality in the reformer.

14 Claims, 10 Drawing Sheets

METHOD AND APPARATUS FOR DETERMINING STATE OF REFORMER

This application claims priority from Japanese Patent Application No. 2003-303204 filed Aug. 27, 2003, which is incorporated hereinto by reference.

BACKGROUND OF THE INVENTION

1. Field of the Invention

The present invention relates to apparatus and methods for determining a state of a reformer for producing a reformed fuel to be supplied to an internal combustion engine by reforming a fuel air mixture.

2. Description of the Related Art

For example, Japanese Patent Application Laid-open No. 2002-54427 discloses an apparatus for adding a reformed gas (reformed fuel) containing CO and $H_2$ to a fuel to be supplied to a combustion chamber of an internal combustion engine or an exhaust gas discharged from the combustion chamber. This apparatus includes a CO shift catalyst (reformer) in which a precious metal is carried by a carrier having an oxygen-absorption capacity. The CO shift catalyst reforms CO and $H_2O$ to $H_2$ and $CO_2$ by a water gas shifting reaction to produce a reformed gas containing CO and $H_2$. The Co shift catalyst deteriorates with the lapse of time. Thus, a concentration ratio between CO and $H_2$ ($CO/H_2$ concentration ratio) in the reformed gas produced by the CO shift catalyst also varies with the lapse of time, and a deterioration of an exhaust emission may be caused. Therefore, in the conventional apparatus, the oxygen absorption capacity of the CO shift catalyst is obtained from the oxygen concentration at a fluid inlet and a fluid outlet of the CO shift catalyst. Then, a state of the CO shift catalyst or the $CO/H_2$ concentration ratio of the reformed gas relating to the degree of deterioration of the catalyst is estimated based on the obtained value indicating the oxygen absorption capacity. Further, an amount of the reformed gas to be added to the fuel or the exhaust gas of the internal combustion engine is determined based on the estimated $CO/H_2$ concentration ratio.

However, it is not easy to precisely obtain the oxygen absorption capacity of the catalyst. Therefore, in the above-mentioned prior art, it is difficult to easily and precisely determine the state (the degree of deterioration or the abnormality) of the catalyst.

SUMMARY OF THE INVENTION

The present invention is directed to overcome one or more of the problems as set forth above.

One aspect of the present invention relates to an apparatus for determining a state of a reformer for producing a reformed fuel to be supplied to an internal combustion engine by reforming a fuel air mixture. The apparatus comprises: detecting means (engine operational condition detecting means) for detecting an operational condition of the internal combustion engine; and determining means for determining whether or not the reformer normally operates based on the operational condition of the internal combustion engine detected by the detecting means.

Another aspect of the present invention relates to a method for determining a state of a reformer for producing a reformed fuel to be supplied to an internal combustion engine by reforming a fuel air mixture. The method comprises the steps of: (a) detecting an operational condition of the internal combustion engine; and (b) determining whether or not the reformer normally operates based on the operational condition detected at step (a).

The above and other objects, effects, features and advantages of the present invention will become more apparent from the following description of embodiments thereof taken in conjunction with the accompanying drawings.

BRIEF DESCRIPTION OF THE DRAWINGS

FIG. 9 is a graph for explaining the second embodiment of the present invention, illustrating a variation of MFB due to a deterioration of a reforming catalyst or the like.

DETAILED DESCRIPTION OF PREFERRED EMBODIMENTS

In an internal combustion engine generating power by combustion in a combustion chamber of reformed fuel produced by a reformer, a reforming catalyst for reforming a fuel air mixture deteriorates with the lapse of time, and an abnormality or the like may occur in the reformer in some cases. In such cases, a ratio of the reformed gas component (for example, CO or $H_2$) in the reformed fuel produced in the reformer is reduced, and in accordance therewith, a change is recognized in operational conditions of the internal combustion engine. The operational conditions of the internal combustion engine (such as a variation in a rotational speed and a combustion speed) can be easily and precisely obtained among various parameters relating to an operational state of the reformer by detecting means or engine operational condition detecting means. Accordingly, as in the present invention, it is possible to easily and precisely find the deterioration or abnormality of the reforming catalyst by determining whether or not the reformer normally operates based on the operational condition of the internal combustion engine detected by means for detecting the engine operational condition.

The operational condition can be the variation of the rotational speed of the internal combustion engine. The variation of the rotational speed is preferably a difference of an actual rotational speed from a target rotational speed when an air-fuel ratio is made to be lean or an ignition timing is retarded at a predetermined condition (for example, during an idling of the engine).

The operational condition may be the combustion speed of the reformed fuel in the internal combustion engine. The combustion speed of the reformed fuel can be obtained based on any of MBT (Minimum advance for Best Torque), an internal pressure of a cylinder (MFB: Mass Fraction Burnt) or an exhaust gas temperature of the internal combustion engine.

Further, when a non-reformed fuel is supplied to the internal combustion engine together with the reformed fuel, a criterion for determining whether or not the reformer normally operates is preferably changed in accordance with a ratio between the reformed fuel and the non-reformed fuel.

Preferred embodiments according to the present invention will now be described with reference to drawings.

(First Embodiment)

Figure 1:
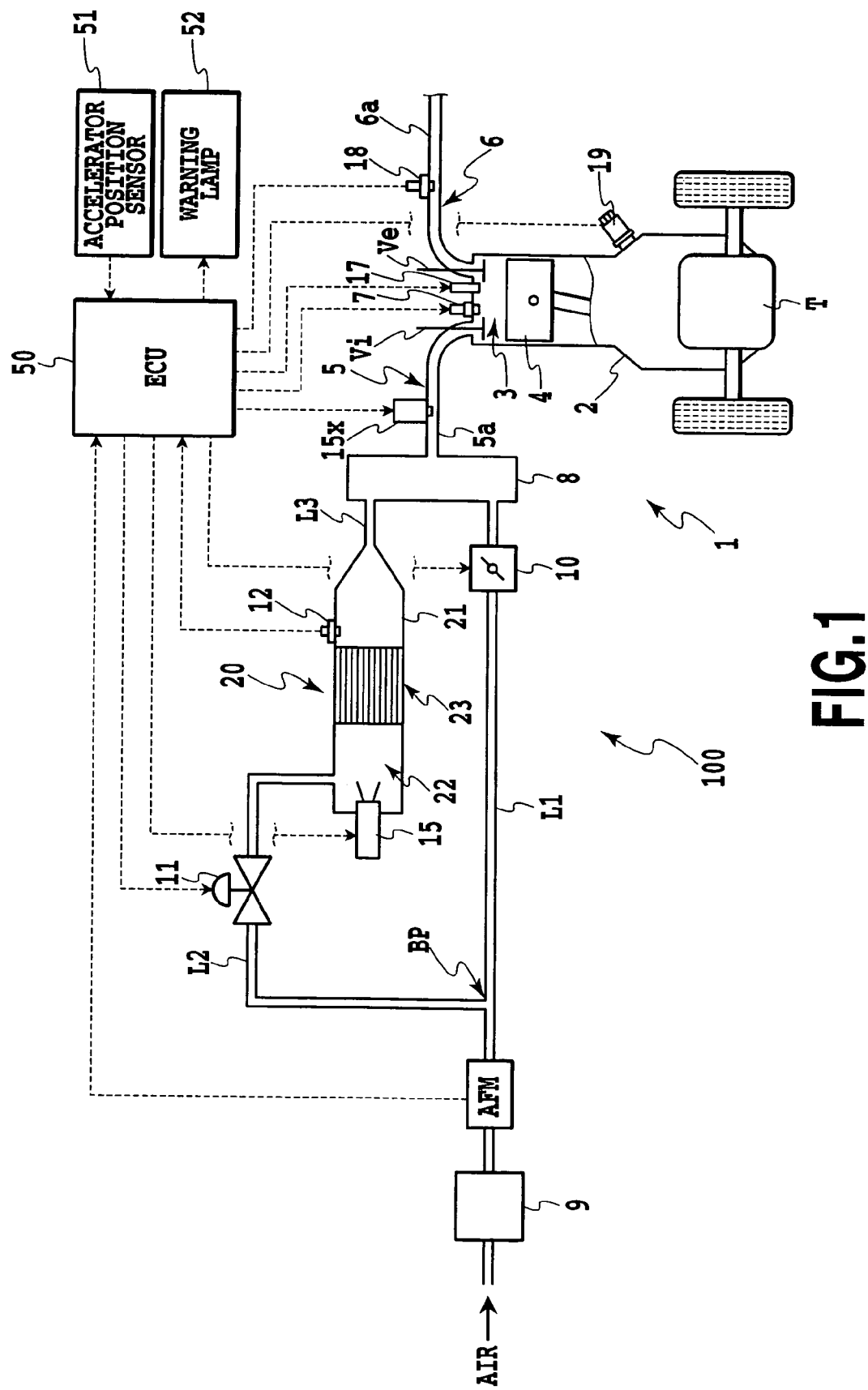
FIG. 1 is a schematic illustration of a vehicle having an internal combustion engine to which is applied an apparatus for determining a deterioration of a state of a reformer according to a first embodiment of the present invention.

FIG. 1 is a schematic illustration of a vehicle having an internal combustion engine to which is applied an apparatus for determining a state of a reformer according to a first embodiment of the present invention. The vehicle 100 shown in FIG. 1 has an internal combustion engine 1 as a power unit for driving wheels W via a trans-axle T. The internal combustion engine 1 generates power by combustion of a fuel air mixture containing a reformed gas component in combustion chambers 3 formed in an cylinder block 2 to reciprocate a piston 4 in the respective combustion chambers 3. While only one cylinder is illustrated in FIG. 1, the internal combustion engine 1 of this embodiment is preferably configured as a multi-cylinder engine (for example, a four-cylinder engine).

An intake port of each combustion chamber 3 is connected to an intake pipe 5a constituting an intake manifold 5, while an exhaust port of each combustion chamber 3 is connected to an exhaust pipe 6a constituting an exhaust manifold 6. Also, in a cylinder head of the internal combustion engine 1, an intake valve Vi for opening and closing the intake port and an exhaust valves Ve for opening and closing the exhaust port are disposed with respect to each of the combustion chambers 3. The intake valves Vi and the exhaust valves Ve are operated by a valve-operating mechanism (not shown) preferably having a variable valve-timing function. Further, in the cylinder head of the internal combustion engine 1, an ignition plug 7 and a cylinder internal pressure sensor 17 are disposed with respect to each of the combustion chambers 3. The cylinder internal pressure sensor 17 detects an internal pressure (cylinder internal pressure) of the corresponding combustion chamber 3. Also, the exhaust manifold 6 is provided with an exhaust gas temperature sensor 18 for detecting a temperature of an exhaust gas from the respective combustion chambers 3. The exhaust manifold 6 is connected to a catalyst unit (ternary catalyst) not shown.

As shown in FIG. 1, the intake manifold 5 (respective intake pipes 5a) is connected to a surge tank 8, and the intake manifold 5 and the surge tank 8 constitute an air intake system of the internal combustion engine 1. Also, an air supply pipe L1 is connected to the surge tank 8. The air supply pipe L1 is connected to an air inlet not shown via an air cleaner 9. A throttle valve (an electronic throttle valve in this embodiment) 10 is incorporated in the air supply pipe L1 between the surge tank 8 and the air cleaner 9.

Further, the air supply pipe L1 is provided with an air flow meter AFM which is located between the air cleaner 9 and the throttle valve 10. A bypass pipe L2 is branched from the air supply pipe L1 at a branched point BP positioned between the throttle valve 10 and the air flow meter AFM. The bypass pipe L2 has a flow control valve 11 in the midpoint thereof. A front end (an end opposite to the branched point BP) of the bypass pipe L2 is connected to a reformer 20.

The reformer 20 has a generally tubular body 21 closed at opposite ends thereof. The body 21 includes an air-fuel mixing section 22 and a reforming reaction section 23 adjacent the air-fuel mixing section 22 in the interior thereof. A fuel injection valve 15 is connected to the air-fuel mixing section 22 in addition to the bypass pipe L2. The fuel injection valve 15 is connected to a fuel tank via a fuel pump (not shown respectively) and is capable of injecting a hydrocarbon fuel such as gasoline into the air-fuel mixing section 22. Also, a reforming catalyst, for example, carrying rhodium on zirconium oxide is disposed in the reforming reaction section 23. An outlet of the reformer 20 is connected to the surge tank 8 via a connecting pipe L3. Accordingly, the reformer 20 is disposed to bypass the air supply pipe L1. Further, the reformer 20 is provided with a temperature sensor 12. In this embodiment, the temperature sensor 12 is attached to the body 21 to be positioned downstream from the reforming reaction section 23 so that the temperature of the reformed gas flowing out from the reforming reaction section 23 can be detected.

Also, the internal combustion engine 1 has a plurality of fuel injection valves 15x. Each intake pipe 5a is provided with one fuel injection valve 15x so that the fuel (non-reformed fuel, for example, gasoline) in the fuel tank is injected from the fuel injection valve 15x into the respective intake pipes 5a. Accordingly, in the internal combustion engine 1, it is possible to obtain the power under the condition in which the reformer 20 is operated or the supply of air and the fuel to the reformer 20 is stopped. The fuel injection valve 15x may be of a type injecting the fuel directly into the corresponding combustion chamber 3.

The above-mentioned ignition plugs (igniter) 7, the valve-operating mechanism, the throttle valve 10, the flow control valve 11, the temperature sensor 12, the cylinder internal pressure sensors 17, the exhaust gas temperature sensor 18, the air flow meter AFM and the like are connected to an electronic control unit (hereinafter referred to as "ECU") 50 serving as means for controlling the internal combustion engine 1. The ECU 50 includes CPU, ROM, RAM, input/output interfaces and storage devices for memorizing various information and maps. Also, the internal combustion engine 1 includes a crank angle sensor 19 and accelerator position sensor 51. The crank angle sensor 19 provides the ECU 50 with a signal indicating a crank angle and the accelerator position sensor 51 provides the ECU 50 with a signal indicating an operating amount of an accelerator pedal. The ECU 50 controls an opening degree of the throttle valve 10 and the flow control valve 11, a rate of fuel injection through the fuel injection valve 15 or 15x and the ignition timing of the respective ignition plugs 7 based on the signals from the air flow meter AFM, the crank angle sensor 19, the accelerator position sensor 51 and the like.

When the vehicle 100 is driven, air is introduced into the air-fuel mixing section 22 of the reformer 20 via the flow control valve 11 of the bypass pipe L2 of which opening degree is adjusted by the ECU 50. Also, the fuel such as gasoline is injected from the fuel injection valve 15 controlled by the ECU 50 into the air-fuel mixing section 22. The fuel such as gasoline gasifies in the air-fuel mixing section 22 and mixes with air supplied from the bypass pipe L2, so that a fuel air mixture flows into the reforming reaction section 23. In the reforming reaction section 23, the hydrocarbon fuel and air are reacted each other by the reforming catalyst, so that the partially oxidation reaction represented by the following equation (1) is proceeded.

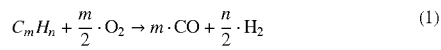

$$C_m H_n + \frac{m}{2} \cdot O_2 \rightarrow m \cdot CO + \frac{n}{2} \cdot H_2 \qquad (1)$$

By the proceeding of the reaction represented by the above equation (1), the reformed gas (reformed fuel) containing CO and $H_2$ (components of the reformed gas) is produced. The resultant reformed gas is introduced into the surge tank 8 via the connecting pipe L3. Also, air is introduced into the surge tank 8 via the throttle valve 10 of the air supply pipe L1 which opening degree is adjusted by the ECU 50. Accordingly, the reformed gas introduced from the reformer 20 into the surge tank 8 is further mixed with air, and thereafter, sucked into the respective combustion chambers 3. When each ignition plug 7 is operated at the predetermined timing, the reformed gas components of CO and $H_2$ burn within the respective combustion chambers 3. As a result, the piston 4 reciprocates within the respective combustion chambers 3 so that the driving wheels W can be driven through the trans-axle T.

As described above, the internal combustion engine 1 of the vehicle 100 is driven by using the reformed gas (reformed fuel) produced by the reformer 20. With the lapse of time, however, the reforming catalyst disposed in the reforming reaction section 23 of the reformer 20 is deteriorated. Thus, the concentration of CO and $H_2$ in the reformed gas produced in the reforming reaction section 23 becomes also less as the reforming catalyst has been deteriorated. This may result in the problem in that a desired torque is not obtained from the internal combustion engine 1 or the exhaust gas emission becomes worse. Also, there may be some trouble to disturb the normal production of the reformed gas in the reformer 20. Therefore, to drive the internal combustion engine 1 and the vehicle 100 stably, it is important to precisely know whether or not the reformer 20 normally operates, that is, the degree of deterioration and the abnormality of the reforming catalyst. For this purpose, in the internal combustion engine 1 of the vehicle 100, the ECU 50 and various sensors constitute an apparatus for determining a state of the reformer 20. That is, the ECU 50 executes a procedure for determining the state of the reformer 20 during the operation of the reformer 20 under the predetermined engine operational condition, as shown in FIG. 2.

Figure 2:
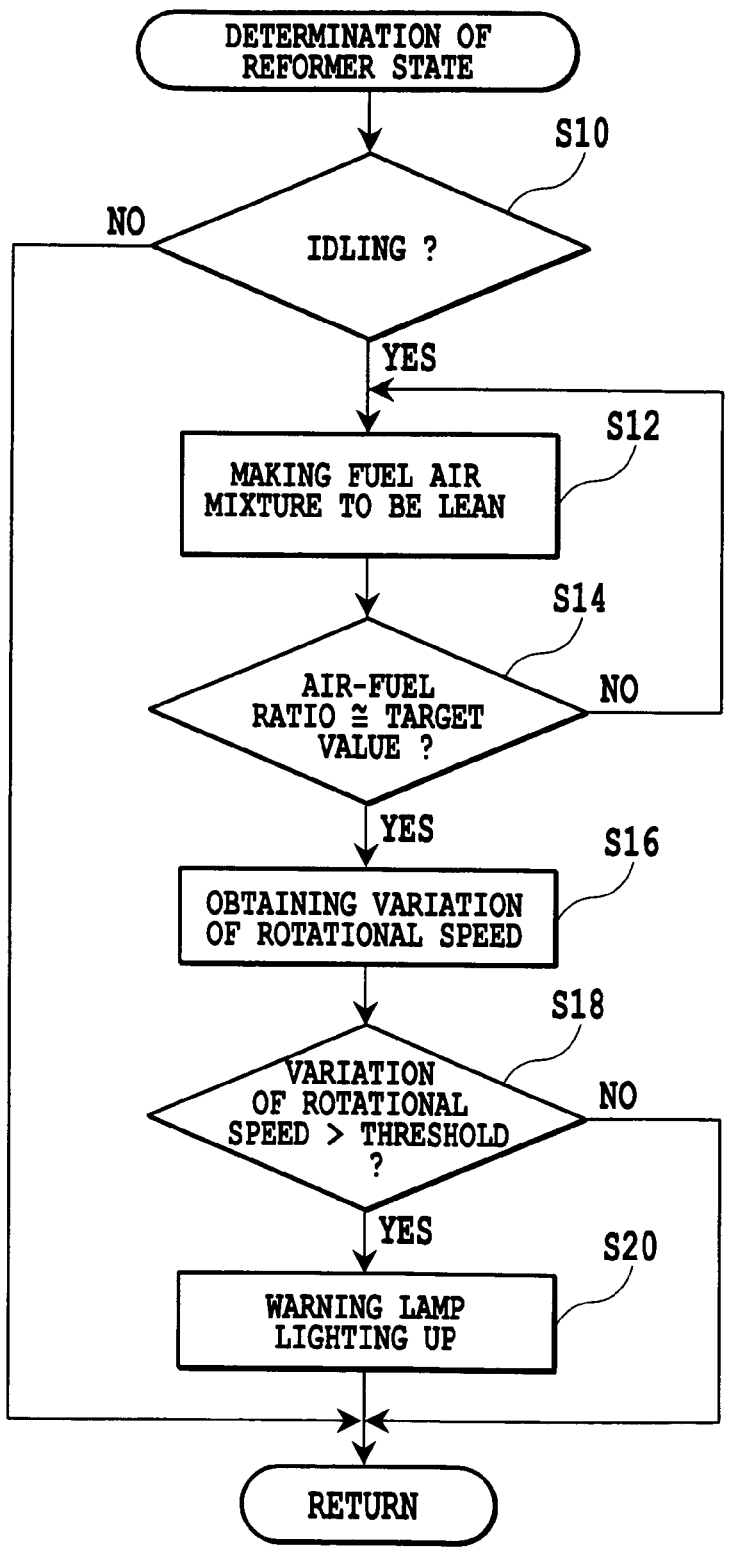
FIG. 2 is a flow chart for explaining a procedure for determining the state of the reformer in the internal combustion engine of FIG. 1.

According to this embodiment, as shown in FIG. 2, the procedure for determining the state of the reformer 20 is executed during an idling of the internal combustion engine 1 in which the rotational speed of the engine 1 is generally constant and substantially no load is applied to the engine 1. The ECU 50 determines whether or not the internal combustion engine 1 is idling at the timing when the determination of the reformer state is to be executed (S10). When the internal engine 1 is idling, the ECU 50 controls at least one of the throttle valve 10, the flow control valve 11 and the fuel injection valve 15 so as to make the fuel air mixture of the reformed fuel and air to be supplied to the respective combustion chambers 3 to be (slightly) lean at a predetermined ratio (S12).

Then, the ECU 50 obtains an air-fuel ratio of the fuel air mixture to be supplied to the respective combustion chambers 3 based on a measured value of the air flow meter AFM, the fuel injection rate through the fuel injection valve 15 and the like. Further, the ECU 50 determines whether or not the obtained air-fuel ratio reaches a predetermined target value (S14). This target value has been determined to be lean to an extent (larger than a theoretical air-fuel ratio) so that a variation of a rotational speed of the internal combustion engine 1 during the idling is not so significant. The ECU 50 gradually makes the fuel air mixture to be lean at S12, until it determines at S14 that the air-fuel ratio of the fuel air mixture to be supplied to the respective combustion chambers 3 reaches the predetermined target value. When determining that the air-fuel ratio of the fuel air mixture has reached the predetermined target value (S14), the ECU 50 obtains a difference of an actual rotational speed of the internal combustion engine 1 from a target rotational speed during the idling (the variation of the rotational speed) based on the signal from the crank angle sensor 19 (S16).

Figure 3:
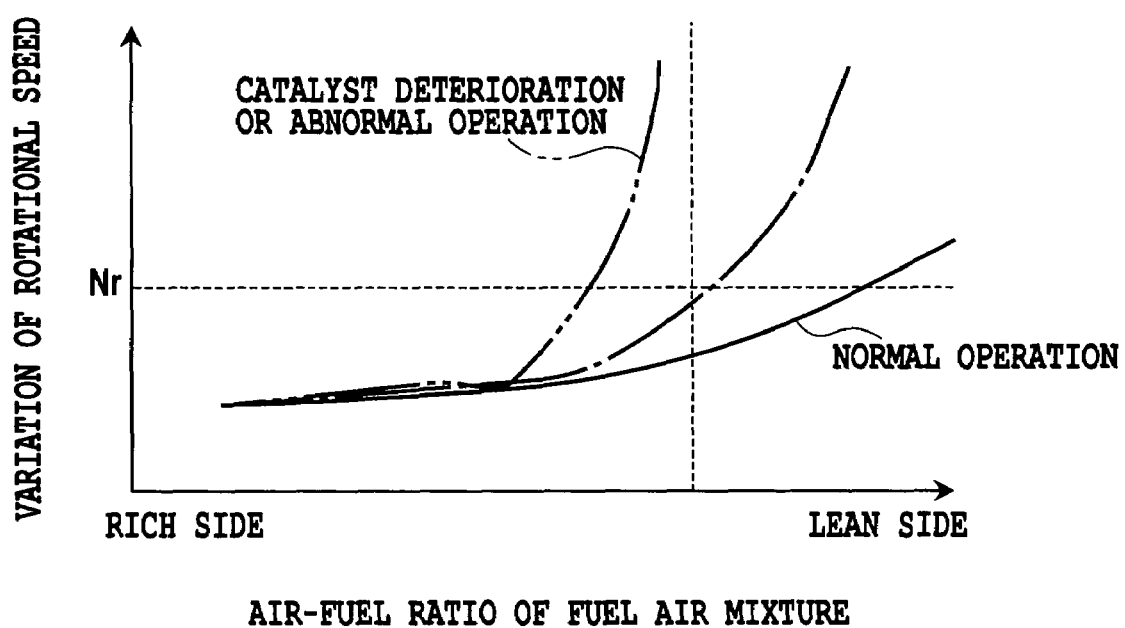
FIG. 3 is a graph illustrating a relationship between an air-fuel ratio of a fuel air mixture supplied to the internal combustion engine and a variation of a rotational speed the engine.

When making the fuel air mixture supplied to the respective combustion chambers 3 to be lean during the idling in which the rotational speed of the engine 1 is generally constant and substantially no load is applied to the engine 1, as seen from FIG. 3, the difference of the actual rotational speed of the engine 1 from the target rotational speed during the idling does not excessively increase, but gradually increases, provided no deterioration occurs in the reforming catalyst and the reformer 20 normally operates. Contrarily, if the deterioration of the reforming catalyst has reached an advanced stage, the difference of the actual rotational speed of the engine 1 from the target rotational speed during the idling becomes larger as the fuel air mixture to be supplied to the respective combustion chambers 3 is leaner as shown by a one-dot chain line in FIG. 3. Further, when the deterioration of the reforming catalyst exceeds an allowable limit or there is any abnormality in the reformer 20, the difference of the actual rotational speed of the engine 1 from the target rotational speed during the idling suddenly increases to exceed a predetermined threshold value Nr if the fuel air mixture supplied to the respective combustion chambers 3 is made to be lean to a some extent as shown by a two-dot chain line in FIG. 3.

In view of the foregoing, in the vehicle 100 of this embodiment, the threshold value Nr described above is obtained in advance based on experimental data or others and stores in a memory of the ECU 50. When the variation of the rotational speed obtained at S16 exceeds the threshold value Nr, the ECU 50 determines that the reforming catalyst has deteriorated or the abnormality occurs in the reformer 20 (S18), and makes a predetermined warning lamp 52 of the vehicle 100 light up (S20). On the other hand, when it is determined at S18 that the variation of the rotational speed is less or equal to the threshold value Nr, the ECU 50 considers that the reforming catalyst does not deteriorate and there is no abnormality in the reformer 20, and waits for the next timing for executing the procedure for determining the state of the reformer 20.

As described above, according to the vehicle 100 of this embodiment, it is determined whether or not the reformer 20 normally operates based on the variation of the rotational speed (operational condition) of the internal combustion engine 1 detected by ECU 50 and the crank angle sensor 19

(engine operational condition detecting means), in view of a fact that a ratio of the reformed gas component (for example, CO or $H_2$) in the reformed gas produced in the reformer 20 lowers due to the deterioration of the reforming catalyst or others, and in accordance therewith, the operational condition of the internal combustion engine 1 varies. In this case, the variation the rotational speed of the internal combustion engine 1 (the difference from the target value) is one which is easily and precisely obtainable among various parameters relating to the operational state of the reformer 20. Accordingly, it is possible to easily and precisely find the deterioration or the abnormality of the reforming catalyst in the internal combustion engine 1.

In addition, at S14, instead of obtaining the air-fuel ratio of the fuel air mixture to be supplied to the respective combustion chambers 3 based on the measured value of the air flow meter AFM, the fuel injection rate through the fuel injection valve 15 and the like, the air-fuel ratio of the fuel air mixture may be obtained based on the air-fuel ratio of the exhaust gas detected by an exhaust gas A/F sensor (not shown) provided in the exhaust pipe 6a. Also, instead of or in addition to lighting the warning lamp 52 at S20, a fact that the deterioration occurs may be recorded in a predetermined location of the memory.

Further, in the above-mentioned internal combustion engine 1, the reformed gas (reformed fuel) produced in the reformer 20 and fuel (non-reformed fuel) from the fuel injection valve 15x may be simultaneously used. In such a case, the above threshold value Nr for determining whether or not the reformer 20 normally operates is preferably changed in accordance with a ratio of the reformed gas and the non-reformed gas (a ratio of an amount of the fuel supplied to the reformer 20 relative to an amount of the fuel injected from the fuel injection valve 15x). For this purpose, a map defining a relationship between the ratio of the reformed gas to the non-reformed gas and the threshold value Nr may be stored in the memory of ECU 50. In this case, the ratio of the reformed gas to the non-reformed gas is obtained prior to S18 in FIG. 2, and the threshold value Nr corresponding to the obtained ratio is read from the map.

Figure 4:
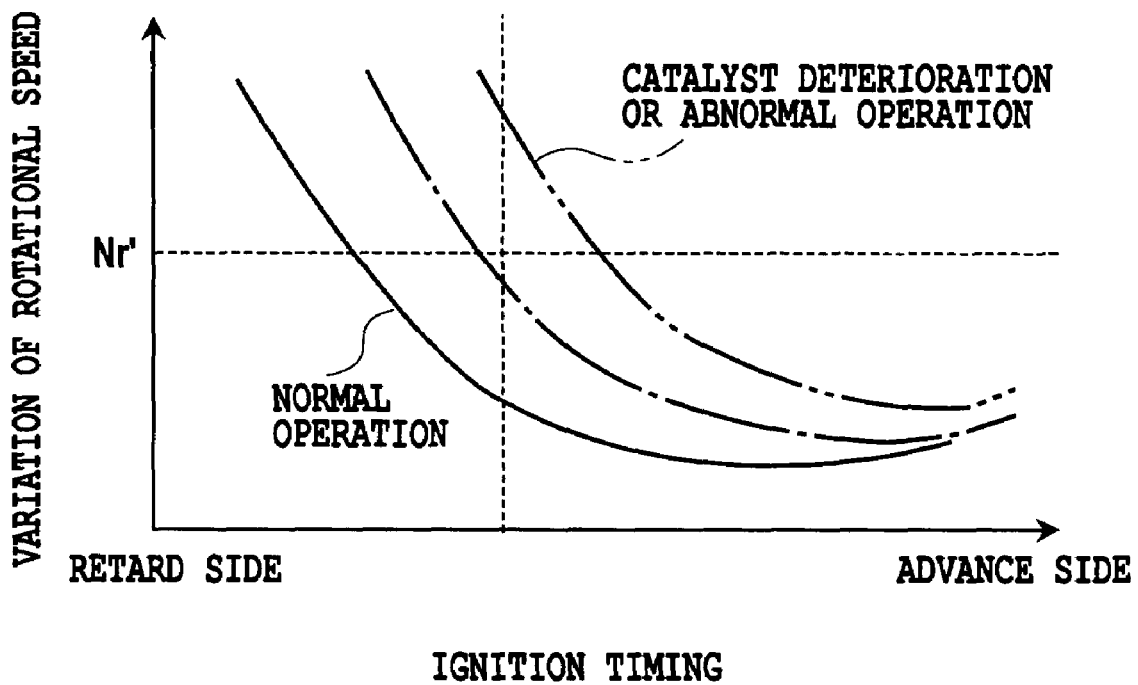
FIG. 4 is a graph relating to an alteration of the first embodiment of the present invention, illustrating the variation of the rotational speed of the internal combustion engine when an ignition timing is changed during an idling of the engine.

FIG. 4 relates to an alteration of the first embodiment according to the present invention. FIG. 4 shows the variation of the rotational speed of the internal combustion engine 1 when the ignition timing of the ignition plug 7 varies during the idling of the engine 1. When the ignition timing is being retarded in the respective combustion chambers 3 during the idling in which the engine rotational speed is maintained generally constant and substantially no load is applied to the engine 1, the variation of the rotational speed, that is, the difference of the actual rotational speed of the engine 1 from the target rotational speed during the idling is within a predetermined range as shown by a solid line in FIG. 4, provided the reforming catalyst does not deteriorate and the reformer 20 normally operates. Contrarily, when the deterioration of the reforming catalyst has reached an advanced stage, as the ignition timing is retarded in the respective combustion chambers 3 during the idling, the variation of the rotational speed (the difference of the actual rotational speed from the target rotational speed) becomes larger as shown by a one-dot chain line in FIG. 4. Further, if the deterioration of the reforming catalyst exceeds the allowable limit or there is any abnormality in the reformer 20, the variation of the rotational speed exceeds a predetermined threshold value Nr' as shown by a two-dot chain line in FIG. 4 as the ignition timing is retarded to some extent in the respective combustion chambers 3 during the idling.

Figure 5:
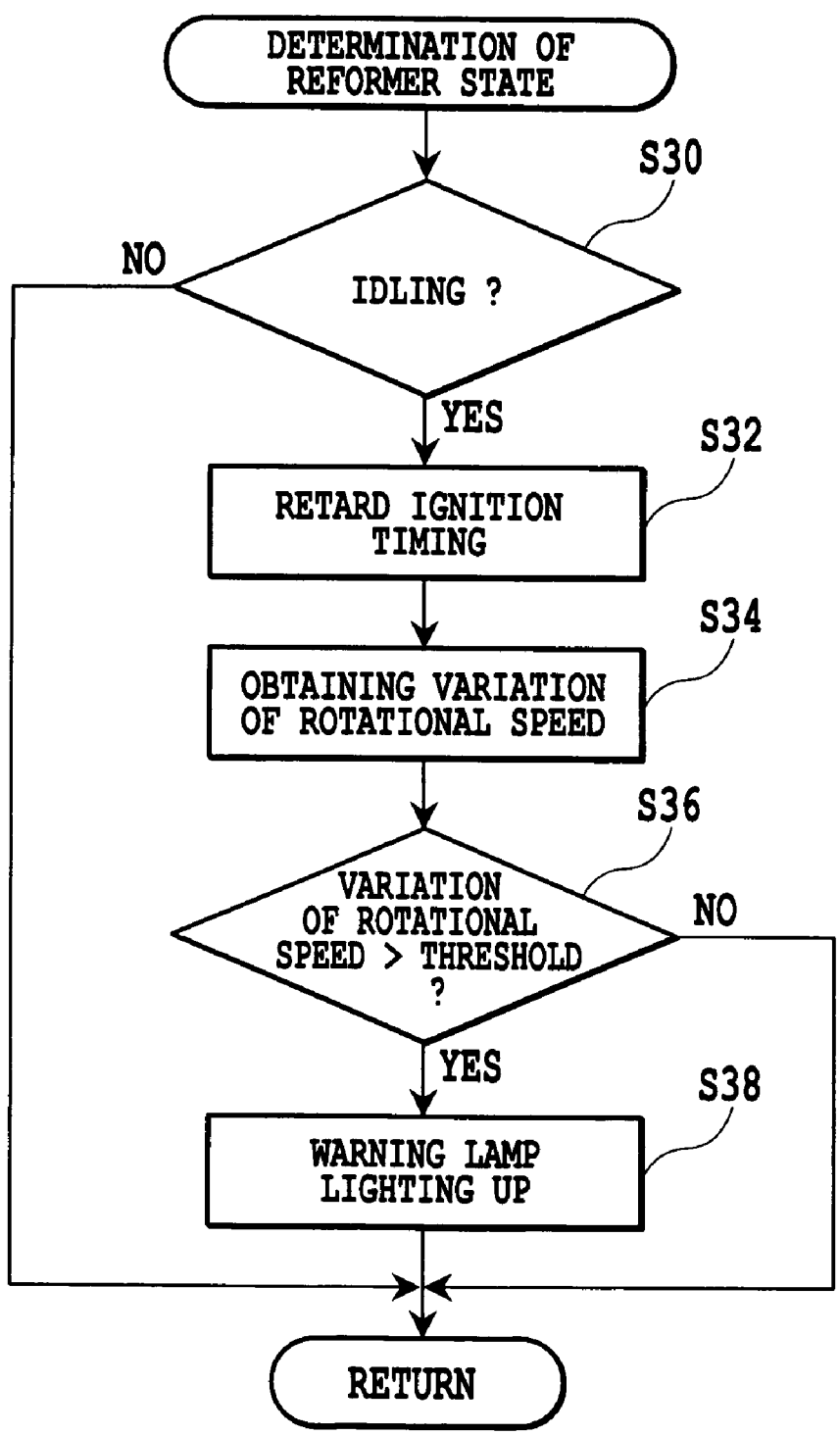
FIG. 5 is a flow chart for explaining a procedure for determining the state of the reformer according to the alteration of the first embodiment of the present invention.

Accordingly, it is possible to use a procedure shown in FIG. 5 instead of the procedure shown in FIG. 2 in the internal combustion engine 1. In the procedure of FIG. 5, the operational state of the reformer 20 is determined based on the variation of the rotational speed obtained when the ignition timing is retarded under the predetermined engine-operational condition. In this embodiment, the procedure for determining the state of the reformer 20 is executed during the idling of the internal combustion engine 1 in which the engine rotational speed is maintained generally constant and substantially no load is applied to the engine 1. The ECU 50 determines whether or not the internal combustion engine 1 is idling when the timing has been reached at which the procedure for determining the state of the reformer 20 is to be executed (S30). Further, the ECU 50 retards the ignition timing in the respective combustion chambers 3 by a predetermined angle when it is necessary to execute the procedure and the internal combustion engine 1 is idling (S32).

When the ignition timing has been retarded in the respective combustion chambers 3 and the ignition is carried out in the respective combustion chambers 3, the ECU 50 obtains the difference of the actual rotational speed of the internal combustion engine 1 from the target rotational speed during the idling (the variation of the rotational speed) based on the signal from the crank angle sensor 19 (S34). When the difference exceeds the above-mentioned threshold value Nr', the ECU 50 determines that the reforming catalyst has deteriorated or there is any abnormality in the reformer 20 (S36) and makes the warning lamp 52 of the vehicle 100 light up (S38). In addition, instead of or in addition to lighting the warning lamp 52 at S38, a fact that the deterioration occurs may be recorded in a predetermined location of the memory. On the other hand, if it is determined that the variation of the rotational speed is lower than the threshold value Nr' at S36, the ECU 50 considers that the reforming catalyst does not deteriorate and there is no abnormality in the reformer 20, and waits for the next timing for executing the procedure for determining the state of the reformer 20.

As shown in FIG. 5, if the operational state of the reformer 20 is determined based on the variation of the rotational speed when the ignition timing is retarded under the predetermined engine operational condition, it is possible to easily and precisely find the deterioration or the abnormality of the reforming catalyst while securely avoiding a miss-firing in the respective combustion chambers 3. When the reformed gas (reformed fuel) produced in the reformer 20 and the fuel (non-reformed fuel) from the fuel injection valve 15x are simultaneously used, the threshold value Nr' for determining whether or not the reformer 20 normally operates is preferably changed in accordance with a ratio of the reformed gas to the non-reformed fuel. Further, the procedure of FIG. 2 and the procedure of FIG. 5 can be combined to each other. That is, the procedure for determining the state of the reformer 20 may be executed based on the variation of the rotational speed when the air-fuel ratio of the fuel air mixture supplied to the respective combustion chambers 3 is made be lean and the ignition timing is retarded in the respective combustion chambers 3 during the idling of the internal combustion engine 1. In this embodiment, while the description has been made in that the threshold value Nr' is made to change in accordance with the ratio of the reformed gas to the non-reformed fuel, this is not limitative. The target air-fuel ratio at m S12 or the target ignition timing at S32 may be changed in accordance with the ratio of the reformed gas to the non-reformed fuel while maintaining the threshold value Nr constant.

(Second Embodiment)

A second embodiment of the present invention will be described below with reference to FIGS. 6 and 7. The same elements as those described with reference to the first embodiment are referred to same reference numerals and same description will be omitted.

Figure 6:
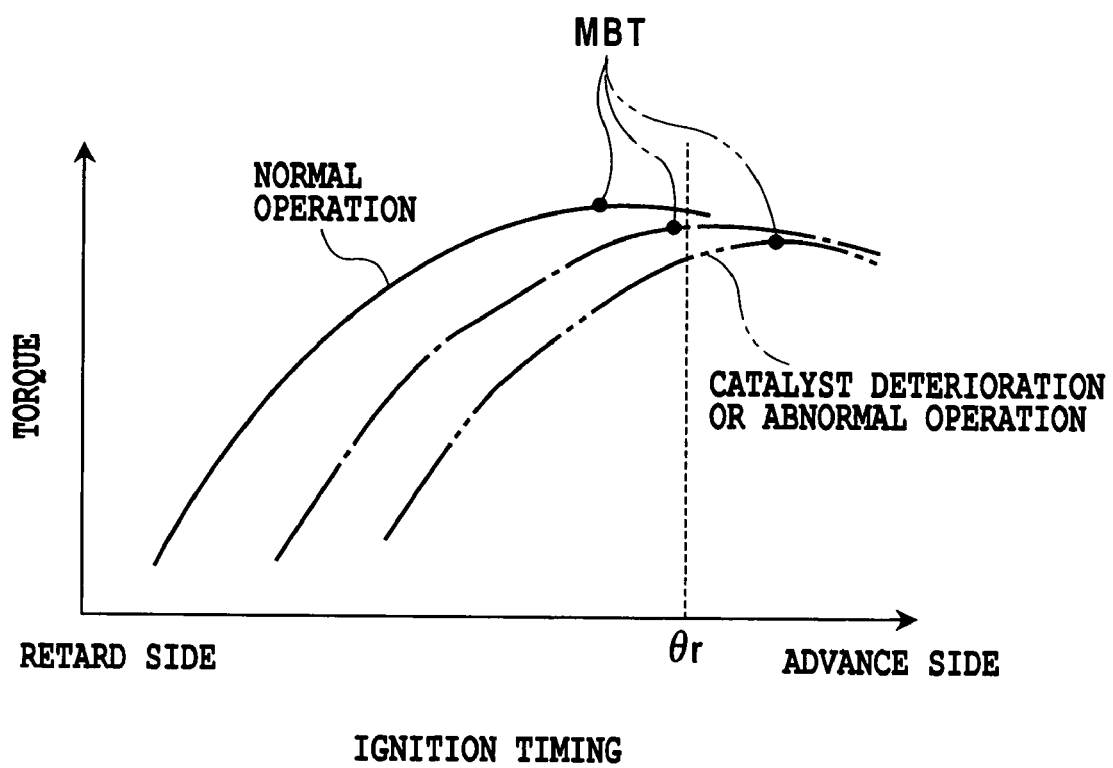
FIG. 6 is a graph relating to a second embodiment of the present invention, illustrating a variation of a torque when an ignition timing is changed while maintaining a rotational speed and a load of the internal combustion engine at predetermined values respectively.

FIG. 6 is a graph illustrating a variation of a torque when an ignition timing of the ignition plug 7 is changed while maintaining a rotational speed and a load of the internal combustion engine 1 at predetermined values respectively. As seen from FIG. 6, when the reformer 20 normally operates, an optimum ignition timing (MBT: minimum advance for best torque) is on the retard side at which a combustion speed of the fuel air mixture is maintained at a high level in the respective combustion chambers 3 and a large torque can be obtained while no knocking occurs.

On the other hand, as the deterioration of the reforming catalyst has reached an advanced stage, an amount of reformed gas produced in the reformer 20 becomes less to lower the combustion speed of the fuel air mixture. Therefore, MBT shifts to the advance side as shown by a one-dot chain line in FIG. 6, when the rotational speed and the load (amount of intake air) of engine are maintained at predetermined values respectively. Further, if the deterioration of the reforming catalyst exceeds the allowable limit or there is any abnormality in the reformer 20, MBT exceeds a predetermined threshold (angle) θr as shown by a two-dot chain line in FIG. 6.

Accordingly, the operational state of the reformer 20 may be determined based on the combustion speed of the fuel air mixture or MBT of the engine 1 under the condition in which the rotational speed and the load (amount of intake air) of the engine 1 are maintained at predetermined values respectively. That is, the operational state of the reformer 20 may be determined based on MBT of the internal combustion engine 1. In this case, as shown in FIG. 7, when the timing has been reached, at which the procedure for determining the state of the reformer 20 is to be executed, the ECU 50 sets the rotational speed and the amount of intake air (load) of the internal engine 1 to predetermined constant values respectively (S40). Further, the ECU 50 advances the ignition timing in the respective combustion chambers 3 by a predetermined angle (S42), and obtains a torque generated by the internal combustion engine 1 at this stage based on the signal from the crank angle sensor 19 (engine rotational speed) and a predetermined map defining a relationship between the engine rotational speed and the torque generated by the engine 1 (S44).

When the torque generated by the engine 1 has been obtained, the ECU 50 determines whether or not the ignition timing set at S42 is MBT based on the variation of the torque in the engine 1 obtained at S44 (S46). In this embodiment, if the torque generated by the engine 1 becomes generally constant for a predetermined period, it is determined that the ignition timing set at S42 is MBT. The ECU 50 advances the ignition timing in the respective combustion chambers 3 at S42 until a positive determination has been done at S46. When determining that the ignition timing set at S42 is MBT (S46), the ECU 50 further determines whether or not MBT, i.e., the ignition timing defined at S42 exceeds the predetermined threshold (angle) θr (S48).

As described above, MBT shifts toward the advance side as the deterioration of the catalyst has progressed. Then, MBT exceeds the predetermined threshold value (angle) θr when the deterioration of the catalyst exceeds the allowable limit or there is any abnormality in the reformer 20. Accordingly, the ECU 50 determines that the reforming catalyst has deteriorated or there is any abnormality in the reformer 20 (S48) when MBT, i.e., the ignition timing set at S42 exceeds the threshold value θr, and makes the warning lamp 52 of the vehicle 100 light up (S50). Contrarily, when it is determined that MBT does not exceed the threshold value θr, the ECU 50 considers that the reforming catalyst does not deteriorate and no abnormality occurs in the reformer 20, and waits for the next timing for executing the procedure for determining the state of the reformer 20.

Figure 7:
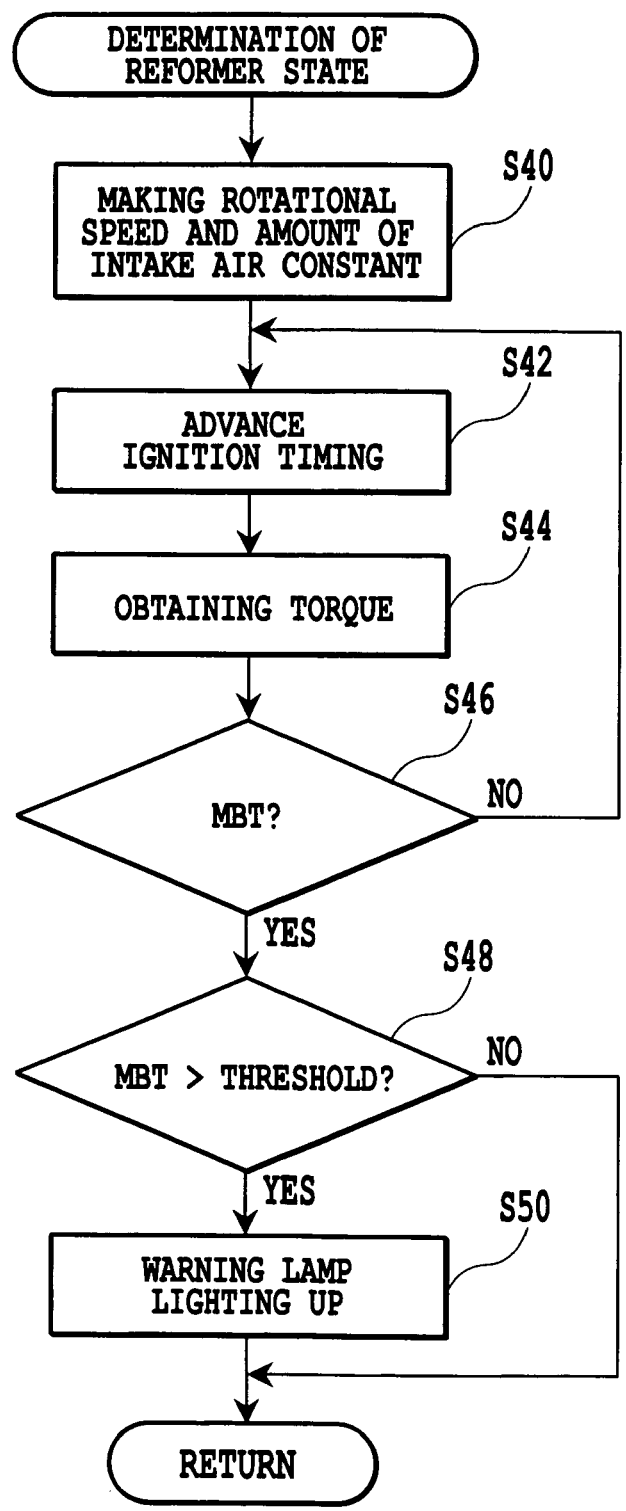
FIG. 7 is a flow chart for explaining a procedure for determining the state of the reformer according to a second embodiment of the present invention.

It is also possible to easily and precisely find the deterioration of the catalyst or the abnormality by determining the operational state of the reformer 20 based on MBT of the internal combustion engine 1 as shown in FIG. 7. If the state of the reformer 20 is determined based on MBT of the internal combustion engine 1, it is possible to easily and precisely find the deterioration or the abnormality of reforming catalyst even if the internal combustion engine 1 is loaded (out of the idling), irrespective of a magnitude of load applied to the engine 1. Also, in this case, when the reformed gas (reformed fuel) produced from the reformer 20 is used together with the fuel (non-reformed gas) from the fuel injection valve 15x, the threshold value θr for determining whether or not the reformer 20 normally operates is preferably changed in accordance with the ratio of the reformed gas to the non-reformed fuel.

On the other hand, according to the internal combustion engine 1 including the cylinder internal pressure sensor 17, the operational state of the reformer 20 (such as the deterioration degree of catalyst) may be determined based on the combustion speed of the fuel air mixture in the respective combustion chambers 3 obtained from the cylinder internal pressure detected by the cylinder internal pressure sensor 17. That is, since the combustion speed of the fuel air mixture in the respective combustion chambers 3 is accurately calculated from MFB (Mass Fraction Burnt) obtained based on the cylinder internal pressure detected by the cylinder internal pressure sensor 17, it is possible to determine the operational state of the reformer 20 based on MFB in the respective combustion chambers 3.

Figure 8:
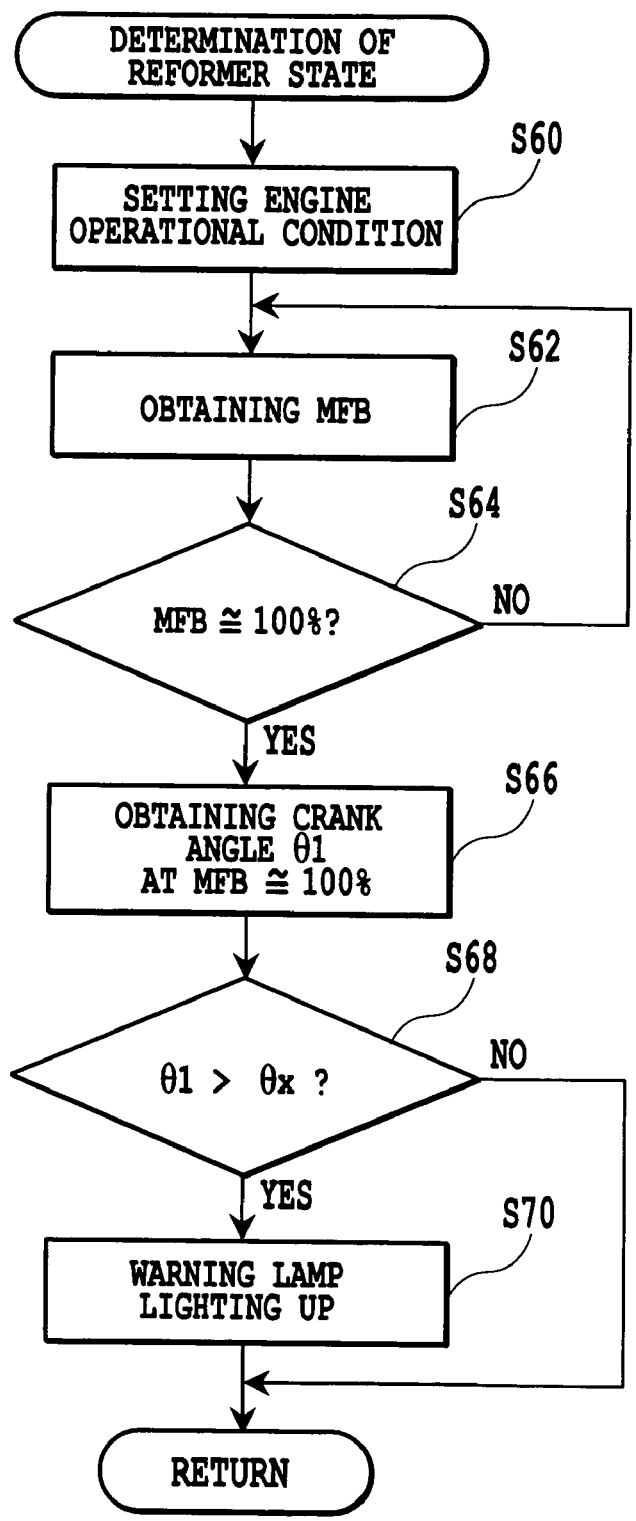
FIG. 8 is a flow chart for explaining a procedure for determining the state of the reformer according to an alteration of the second embodiment of the present invention.

In this case, as shown in FIG. 8, when the timing has been reached for executing the procedure for determining the state of the reformer 20, the ECU 50 sets the rotational speed and the amount of intake air (load) of the internal combustion engine 1 to predetermined constant values respectively (S60). The procedure of FIG. 8 can be executed during the idling of the internal combustion engine 1, wherein the ECU 50 sets the rotational speed and the amount of intake air of the internal engine 1 to values required for the idling respectively.

After the rotational speed and the amount of intake air (load) of the engine 1 are set to the predetermined constant values at S60, the ECU 50 starts the calculation of MFB by using a predetermined equation or others at a criterion time sufficiently before the timing (ignition timing) at which the combustion starts in the respective combustion chambers 3 has been reached (S62). The ECU 50 continues the process of S62 until it determines that the calculated MFB reaches approximately 100% at S64.

Figure 9:
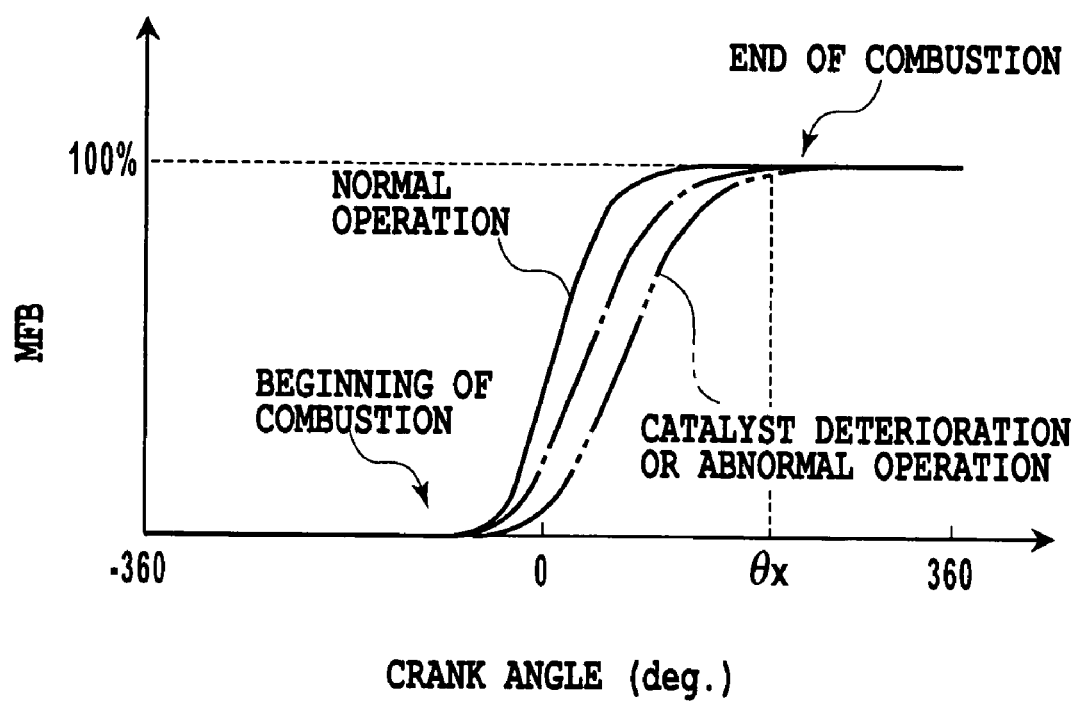

If the reforming catalyst does not deteriorates and the reformer 20 normally operates, the combustion speed of the fuel air mixture in the combustion chamber 3 is maintained at a high level and MFB rapidly becomes approximately 100% after the combustion has started in the combustion chamber 3 as shown by a solid line in FIG. 9. Contrarily, when the deterioration of the reforming catalyst in the reformer 20 has reached an advanced stage, the production of the reformed gas in the reformer 20 decreases to lower the combustion speed of the fuel air mixture in the combustion chamber 3. Therefore, a crank angle at MFB≅100% becomes larger as shown by a one-dot chain line in FIG. 9. Further, if the deterioration of the reforming catalyst exceeds the allowable limit or there is any abnormality in the reformer 20, the crank angle at MFB≅100% exceeds a predetermined threshold value (angle) θx as shown by a two-dot chain line in FIG. 9.

Accordingly, when it is determined at S64 that MFB calculated at S62 reaches approximately 100%, the ECU 50 obtains a crank angle in the respective combustion chambers 3 when MFB reaches approximately 100% (S66). Then, the ECU 50 obtains an average value θ1 of the crank angles obtained at S66. ECU 50 compares the crank angle θ1 (average value) with the threshold value θx (S68). If it is determined at S68 that the crank angle θ1 exceeds the threshold value θx, the ECU 50 determines that the reforming catalyst has deteriorated or there has been any abnormality in the reformer 20, and makes the warning lamp 52 of the vehicle 100 light up (S70). Contrarily, if it is determined at S68 that the crank angle θ1 does not exceeds the threshold value θx, the ECU 50 considers that the reforming catalyst does not deteriorate and there is no abnormality in the reformer 20 and waits for the next timing for executing the procedure for determining the state of the reformer 20.

As shown in FIG. 8, if the operational state of the reformer 20 is determined based on the cylinder internal pressure (MFB), it is possible to easily and precisely find the deterioration or the abnormality of the reforming catalyst. Particularly, if the condition of the reformer 20 is determined based on MFB of the internal combustion engine 1, it is possible easily and precisely find the deterioration or the abnormality of the reforming catalyst, irrespective of a load applied to the internal combustion engine 1, even if the engine 1 is loaded (outside the idling). Also, in this case, when the reformed gas produced in the reformer 20 (reformed fuel) and fuel from the fuel injection valve 15x (non-reformed fuel) are simultaneously used, the threshold value θx for determining whether or not the reformer 20 normally operates is preferably changed in accordance with a ratio of the reformed gas to the non-reformed fuel. In addition, the state of the reformer 20 may be determined based on the variation of the crank angle, for example, from a point at which MFB reaches 10% to a point at which MFB reaches 90%, instead of using the crank angle at which MFB reaches approximately 100%. That is, since the combustion speed becomes slow when the reforming catalyst has deteriorated, it is possible to determine the state of the reformer 20 by using the above-mentioned variation of the crank angle.

Further, in the internal combustion engine 1 of FIG. 1 including the exhaust gas temperature sensor 18, the operational state of the reformer 20 may be determined based on the combustion speed of the fuel air mixture in the respective combustion chambers 3 obtained from the exhaust gas temperature detected by the exhaust gas temperature sensor 18. That is, the combustion speed of the fuel air mixture in the respective combustion chambers 3 has the relation to the exhaust gas temperature detected by the exhaust gas temperature sensor 18 and is obtained from the value detected by the exhaust gas temperature sensor 18. Accordingly, it is possible to determine the operational state of the reformer 20 based on the exhaust gas temperature detected by the exhaust gas temperature sensor 18.

Figure 10:
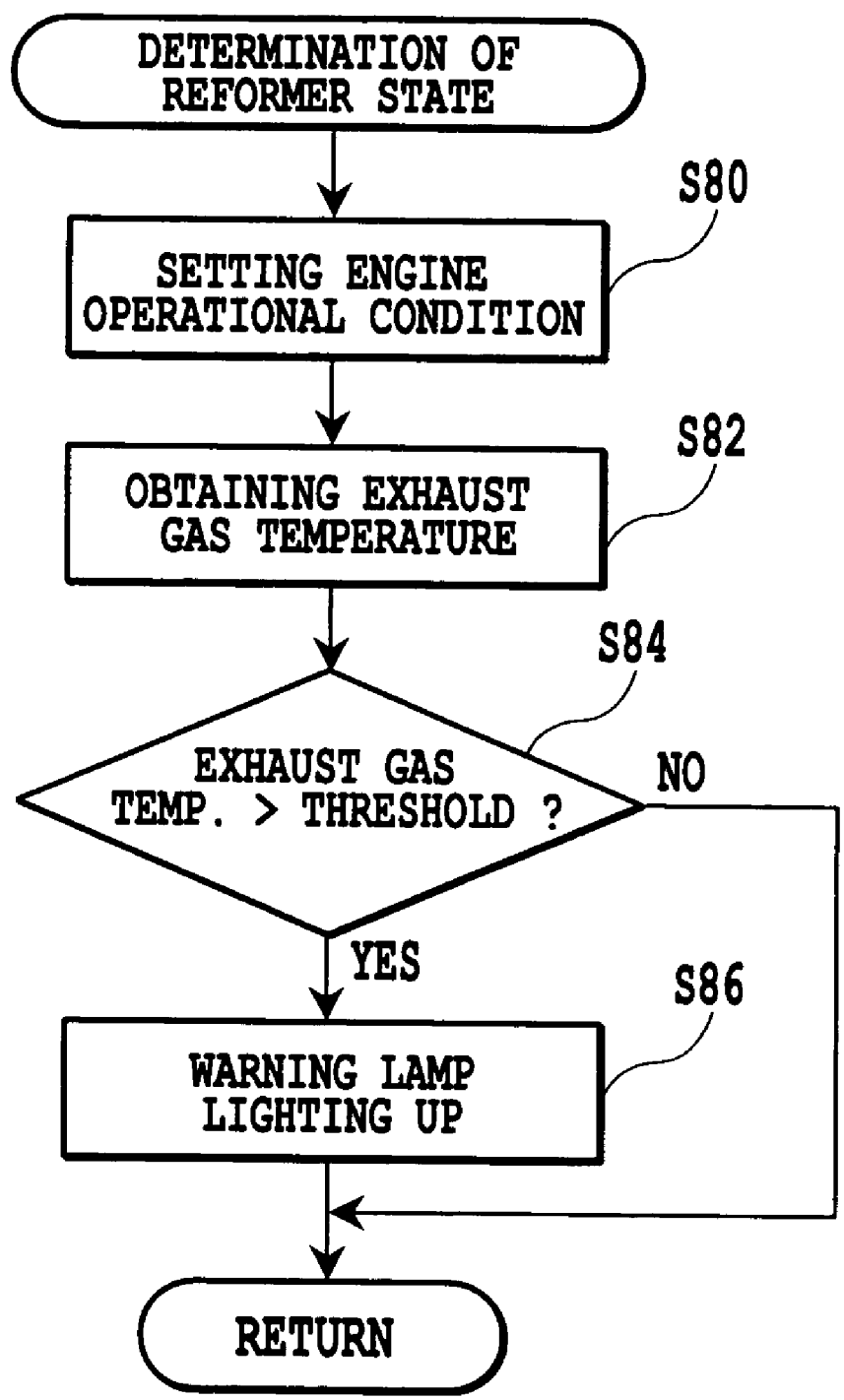
FIG. 10 is a flow chart for explaining a procedure for determining the state of the reformer according to an alteration of the second embodiment of the present invention.

In this case, as shown in FIG. 10, the ECU 50 sets the rotational speed and the amount of intake air (load) of the internal combustion engine 1 to predetermined constant values respectively (S80). The procedure of FIG. 10 may be executed during the idling of the internal combustion engine 1, wherein the ECU 50 sets the rotational speed and the amount of intake air to values required for the idling respectively. After the rotational speed and the amount of intake air of the engine 1 are set to the predetermined values at S80, the ECU 50 obtains the temperature of the exhaust gas from the respective combustion chambers 3 based on the signal from the exhaust gas temperature sensor 18 (S82).

Since the combustion speed of the fuel air mixture in the combustion chamber 3 is maintained at a high level, the exhaust gas temperature is maintained at a relatively low level if the reforming catalyst has not deteriorated and the reformer 20 has normally operated. Contrarily, since the amount of the reformed gas produced in the reformer 20 decreases to lower the combustion speed of the fuel air mixture in the combustion chamber 3, the exhaust gas temperature becomes higher if the deterioration of the reforming catalyst in the reformer 20 has reached an advanced stage. Further, when the deterioration of the reforming catalyst exceeds the allowable limits or there is any abnormality in the reformer 20, the exhaust gas temperature exceeds a predetermined threshold value.

Accordingly, the ECU 50 obtains the exhaust gas temperature at S82 and then compares the same with the threshold value (S84). If the exhaust gas temperature exceeds the threshold value, the ECU 50 determines that the reforming catalyst has deteriorated or there is any abnormality in the reformer 20, and makes the warning lamp 52 of the vehicle 100 light up (S86). On the other hand, if it is determined that the exhaust gas temperature does not exceed the threshold value at S84, the ECU 50 determines that the reforming catalyst does not deteriorate and there is no abnormality in the reformer 20, and waits for the next timing for executing the procedure for determining the state of the reformer 20.

As shown in FIG. 10, it is also possible to easily and precisely find the deterioration or abnormality of the reforming catalyst by determining the operational state of the reformer 20 based on the exhaust gas temperature of the internal combustion engine 1. If the state of the reformer 20 is determined based on the exhaust gas temperature in the internal combustion engine 1, it is possible easily and precisely find the deterioration or the abnormality of the reforming catalyst, irrespective of a load applied to the internal combustion engine 1, even if the engine 1 is loaded (outside the idling). Also, in this case, when the reformed gas produced in the reformer 20 (reformed fuel) and fuel from the fuel injection valve 15x (non-reformed fuel) are simultaneously used, the threshold value θx for determining whether or not the reformer 20 normally operates is preferably changed in accordance with a ratio of the reformed gas to the non-reformed fuel.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. An apparatus for determining a state of a reformer for producing a reformed fuel to be supplied to an internal combustion engine by reforming a fuel air mixture, comprising:

detecting means for detecting an operational condition of said internal combustion engine; and determining means for determining whether or not said reformer normally operates based on said operational condition of said internal combustion engine detected by said detecting means.

2. An apparatus of claim 1, wherein said operational condition is a variation of a rotational speed of said internal combustion engine.

3. An apparatus of claim 2, wherein said variation of said rotational speed is a difference of an actual rotational speed from a target rotational speed when an air-fuel ratio of said internal combustion engine is made to be lean under a predetermined condition.

4. An apparatus of claim 2, wherein said variation of said rotational speed is a difference of an actual rotational speed from a target rotational speed when an ignition timing is retarded under a predetermined condition.

5. An apparatus of claim 1, wherein said operational condition is a combustion speed of said reformed fuel in said internal combustion engine.

6. An apparatus of claim 5, wherein said combustion speed of said reformed fuel is obtained based on MBT of said internal combustion engine, a cylinder internal pressure, a mass fraction burnt or an exhaust gas temperature.

7. An apparatus of claim 1, wherein said internal combustion engine is supplied with said reformed fuel together with a non-reformed fuel, and wherein a criterion for determining whether or not said reformer normally operates is changed in accordance with a ratio of said reformed fuel to said non-reformed fuel.

8. A method for determining a state of a reformer for producing a reformed fuel to be supplied to an internal combustion engine by reforming a fuel air mixture, comprising the steps of:

(a) detecting an operational condition of said internal combustion engine; and (b) determining whether or not said reformer normally operates based on said operational condition detected at step (a).

9. A method of claim 8, wherein said operational condition is a variation of a rotational speed of said internal combustion engine.

10. A method of claim 9, wherein said variation of said rotational speed is a difference of an actual rotational speed from a target rotational speed when an air-fuel ratio of said internal combustion engine is made to be lean under a predetermined condition.

11. A method of claim 9, wherein said variation of said rotational speed is a difference of an actual rotational speed from a target rotational speed when an ignition timing is retarded under a predetermined condition.

12. A method of claim 8, wherein said operational condition is a combustion speed of said reformed fuel in said internal combustion engine.

13. A method of claim 12, wherein said combustion speed of said reformed fuel is obtained based on MBT of said internal combustion engine, a cylinder internal pressure, a mass fraction burnt or an exhaust gas temperature.

14. A method of claim 8, wherein said internal combustion engine is supplied with said reformed fuel together with a non-reformed fuel, said method further comprising the step of:

(c) changing a criterion for determining whether or not said reformer normally operates in accordance with a ratio of said reformed fuel to said non-reformed fuel.

* * * * *